United States Patent
Yang et al.

(10) Patent No.: US 10,723,869 B2
(45) Date of Patent: Jul. 28, 2020

(54) POLYPROPYLENE COMPOSITION AND PREPARATION METHOD THEREOF, AND FILM OR SHEET PREPARED FROM THE POLYPROPYLENE COMPOSITION AND USE THEREOF

(71) Applicants: Kingfa Sci. & Tech. Co., Ltd., Guangzhou, Guangdong (CN); Yanfeng Automotive Trim Systems Co., Ltd., Shanghai (CN)

(72) Inventors: Bo Yang, Guangzhou (CN); Guangwei Zhang, Shanghai (CN); Zhongfu Luo, Guangzhou (CN); Chao Ding, Guangzhou (CN); Xueyong Zhang, Shanghai (CN); Lan Zhao, Shanghai (CN); Jianfeng Hou, Shanghai (CN); Wenlong Li, Guangzhou (CN); Yinghui Zhou, Guangzhou (CN); Nanbiao Ye, Guangzhou (CN); Peng Wang, Guangzhou (CN)

(73) Assignees: Kingfa Sci. & Tech. Co., Ltd. (CN); Yanfeng Automotive Trim Systems Co., Ltd. (CN)

( * ) Notice: Subject to any disclaimer, the term of this patent is extended or adjusted under 35 U.S.C. 154(b) by 139 days.

(21) Appl. No.: 15/759,742

(22) PCT Filed: Sep. 14, 2016

(86) PCT No.: PCT/CN2016/098938
§ 371 (c)(1),
(2) Date: Mar. 13, 2018

(87) PCT Pub. No.: WO2017/045597
PCT Pub. Date: Mar. 23, 2017

(65) Prior Publication Data
US 2019/0048176 A1 Feb. 14, 2019

(30) Foreign Application Priority Data
Sep. 16, 2015 (CN) .......................... 2015 1 0588761

(51) Int. Cl.
| | | |
|---|---|---|
| *C08L 23/12* | (2006.01) | |
| *C08L 23/06* | (2006.01) | |
| *C08L 23/08* | (2006.01) | |
| *C08K 5/134* | (2006.01) | |
| *C08K 5/526* | (2006.01) | |

(52) U.S. Cl.
CPC .............. *C08L 23/12* (2013.01); *C08L 23/06* (2013.01); *C08L 23/0815* (2013.01); *C08K 5/134* (2013.01); *C08K 5/526* (2013.01); *C08L 2203/16* (2013.01); *C08L 2207/062* (2013.01); *C08L 2207/10* (2013.01)

(58) Field of Classification Search
CPC ...... C08L 23/12; C08L 23/06; C08L 23/0815; C08L 23/08; C08F 110/06; C08F 10/06; C08J 2323/12; C08J 2423/12; C08J 2423/06; C08J 2423/08; C08J 2423/0815
See application file for complete search history.

(56) References Cited

U.S. PATENT DOCUMENTS

| | | | |
|---|---|---|---|
| 2008/0082328 A1 | 4/2008 | Lee | |
| 2017/0321048 A1* | 11/2017 | Nummila-Pakarinen | ................... C09D 123/12 |
| 2018/0201218 A1* | 7/2018 | Zhang | ..................... B29C 69/00 |

FOREIGN PATENT DOCUMENTS

| | | |
|---|---|---|
| CN | 101659768 A | 3/2010 |
| CN | 101709122 A | 5/2010 |
| CN | 102391583 A | 3/2012 |
| CN | 102838807 A | 12/2012 |
| CN | 103113662 A | 5/2013 |
| CN | 104086895 A | 10/2014 |
| CN | 104592623 A | 5/2015 |
| CN | 105111587 A | 12/2015 |
| JP | 08283360 A * | 10/1996 |
| WO | 0185839 A1 | 11/2001 |

OTHER PUBLICATIONS

International Search Report for PCT/CN2016/098938 dated Nov. 25, 2016.

* cited by examiner

*Primary Examiner* — Kregg T Brooks
(74) *Attorney, Agent, or Firm* — Lerner, David, Littenberg, Krumholz & Mentlik, LLP

(57) ABSTRACT

A polypropylene composition, a preparation method thereof, and a film or a sheet prepared from the polypropylene composition and use thereof. The composition includes 45 parts to 75 parts of a polypropylene, 10 parts to 35 parts of an elastomer, 5 parts to 20 parts of a polyethylene, 0.1 parts to 0.5 parts of an antioxidant, and 0.1 parts to 0.5 parts of a lubricant. A half peak width of a crystallization peak of the polypropylene is 5° C. to 10° C., and a peak temperature of the crystallization peak of the polypropylene is 105° C. to 115° C. The polypropylene composition has a good tenacity, especially a –30° C. low-temperature impact performance. The film or the sheet prepared from the composition and applied to automotive interior parts, can enable the external accessories not only to be less likely to generate sharp fragments while being strongly impacted, but also to have a matte characteristic.

16 Claims, No Drawings

US 10,723,869 B2

POLYPROPYLENE COMPOSITION AND PREPARATION METHOD THEREOF, AND FILM OR SHEET PREPARED FROM THE POLYPROPYLENE COMPOSITION AND USE THEREOF

CROSS REFERENCE TO RELATED APPLICATIONS

The present application is a national phase entry under 35 U.S.C. § 371 of International Application No. PCT/CN2016/098938, filed Sep. 14, 2016, which claims priority from Chinese Patent Application No. 201510588761.8 filed Sep. 16, 2015, all of which are hereby incorporated herein by reference.

TECHNICAL FIELD

The present invention belongs to a field of macromolecule materials and molding processing thereof, and specifically relates to a polypropylene composition and a preparation method thereof, and a film or a sheet prepared from the polypropylene composition and use thereof.

BACKGROUND

Since polypropylene has advantages of a low cost, a light weight, a high strength, a good chemical resistance, a good processing manufacturability, being easy to be recycled and the like, recently it is widely used in automobiles. However, a shortcoming of the polypropylene is that its low-temperature tenacity is poor. CN101659768 discloses a low-temperature impact resistant polypropylene composition, a preparation method and use thereof as automotive interior parts. The polypropylene composition comprises the following components in percentage by weight: 40-79.8% of a polypropylene resin, 15-35% of a mineral filler, 5-30% of a flexibilizer, 0.1-1% of an antioxidant, and 0.1-1% of a weather-proof agent. All kinds of properties of the automotive interior parts which are prepared from the polypropylene composition by an injection processing can meet an application requirement. The polypropylene composition overcomes a drawback of a poor low-temperature performance, and especially has a good low-temperature impact resistant performance at 0° C. to −40° C. CN101709122A discloses a polypropylene nanocomposite for automobile in a technical field of inorganic chemical industry, and a preparation method thereof. The preparation method comprises: controlling the degradation of a PP with the use of a twin-screw extruder under a temperature of 190-210° C. to ensure a MFR of the PP to be 15-30 g/10 min, then blending the PP with ball-milled inorganic powders, elastomers and a copolymerized PP to pellet with a twin-screw. The polypropylene nanocomposite obtains a good liquidity, and meanwhile has a relatively good impact resistance under high-temperature or low-temperature conditions as well as a rigidity. CN102838807A discloses a polypropylene composite material which has a good impact resistance and low-temperature tenacity, and a preparation method thereof. The composite material consists of the following components in percentage by weight: 30-80% of a polypropylene resin, 10-40% of a polyolefin elastomer with low density and low melt index, 1-30% of a reinforcing filling agent, 1-10% of an interface modifier, and 0.1-4% of other additives. All performance indexes of the polypropylene composite material prepared by this method meet or surpass a predetermined requirement, and especially the low-temperature performance is excellent. A failure mode of multiaxial low-temperature impact of the polypropylene composite material (testing according to the ASTMD3763 with an impact speed of 6.6 m/s) is a ductile failure.

The automotive interior parts, such as an instrument board, an auxiliary instrument board, a door panel, an upright, a glove box and the like, mainly use a thermoplastic polypropylenes material and a thermoplastic polyolefins elastomer (TPO). Phenomena of a fracture and a brittle failure may easily occur to a polypropylene material under an effect of an external force in a low-temperature environment. When an airbag blasts, an airbag door fractures partially and a partial fracture flies out, which are caused by an interference of the airbag to a windscreen, a characteristic slot of the instrument board, a characteristic ridge of the instrument board or other structures due to the deployment of the airbag. It would be likely to threaten the safety of the driver and the passengers when an accident happens which causes the blast of the airbag in the automobile.

Therefore, the automotive interior parts are required to ensure an enough tenacity at an extremely low temperature (−30° C.) and no fragment is allowed to fly out to hurt someone. Besides, as the requirements for the interior parts are becoming higher, how to solve the problem of the low-temperature tenacity of the polypropylene material, improve a welding pull-out force between the instrument board and an airbag frame, and meanwhile improve a tenacity of the parts and hence the instrument board as a whole, has become an important research direction of a polypropylene modified material.

SUMMARY OF THE INVENTION

In order to solve the above-described problem that automotive interior parts tend to undergo a brittle failure under a low-temperature high-speed impact, an object of the present invention is to provide a polypropylene composition. The composition not only has a good normal-temperature impact performance and a good low-temperature impact performance, but also has a characteristic of low gloss.

The present invention is achieved by the following technical solution:

A polypropylene composition comprises the following components in parts by weight based on the whole composition:

a polypropylene 45 parts to 75 parts;
an elastomer 10 parts to 35 parts; and
a polyethylene 5 parts to 20 parts;

wherein a half peak width of a crystallization peak of the polypropylene is 5° C. to 10° C., and preferably 7° C. to 9° C. A peak temperature of the crystallization peak of the polypropylene is 105° C. to 115° C., and preferably 108° C. to 112° C. The half peak width of the crystallization peak and the peak temperature of the crystallization peak are tested at a cooling rate of 10° C./min according to a standard of ISO 11357.

The polypropylene is a homopolymerized polypropylene, with an isotactic index of 94%-98% and a melt flow rate of 1 g/10 min-5 g/10 min under a load of 2.16 kg at 230° C.

The elastomer is one or a mixture of an ethene-hexene copolymer, an ethene-butene copolymer and an ethane-octene copolymer. A density of the elastomer is 0.850 g/cm$^3$ to 0.865 g/cm$^3$, and the melt flow rate at 190° C. under the load of 2.16 kg is 0.1 g/10 min to 3 g/10 min.

The polyethylene is a high-density polyethylene HDPE. The density of the high-density polyethylene HDPE is 0.94 g/cm³ to 0.97 g/cm³, and the melt flow rate at 190° C. under the load of 2.16 kg is 0.01 g/10 min to 0.5 g/10 min.

The polypropylene composition of the present invention, in parts by weight based on the whole composition, further comprises 0.1 part to 0.5 part of an antioxidant and 0.1 part to 0.5 part of a lubricant.

The antioxidant is a mixture of a hindered phenol antioxidant and a phosphites antioxidant in a ratio of 1:1-2.

The lubricant is one or a mixture of a polyethylene wax and an oxidized polyethylene wax.

A preparation method of the above-described polypropylene composition of the present invention comprises the following steps:

(1) weighing each component in proportion, blending the polypropylene, the elastomer and the polyethylene in a high-speed mixer for 1 to 3 minutes, adding the antioxidant and the lubricant followed by blending again for 1 to 3 minutes, with a rotate speed of 1000 to 2000 rpm, and obtaining a premix compound; and (2) melt-extruding the premix compound by a twin-screw extruder, a temperature of each district of the screw being 190-230° C., and obtaining the polypropylene composition by a vacuum pelletizing.

The present invention also discloses a film or a sheet that are prepared from the above-described polypropylene composition. The film or the sheet is produced by means of a rolling process, a calender process, a casting process and the like. A thickness of the film or the sheet is 0.01 mm to 10 mm.

The present invention also discloses use of the above-described film or sheet in products of automotive interior parts. The products of automotive interior parts are an instrument board, an auxiliary instrument board, a pillar, a door panel and the like. The above-described film or sheet can be combined in the back of the instrument board of automobile, and involved in an injection molding process, a friction vibration welding process, a laser weakening process, a soft-touch paint spraying process and production processes of other accessories such as other instrument boards and the like.

Comparing with the prior art, the present invention has the following beneficial effects:

1. The present invention prepares a polypropylene composition material with a good impact performance, especially a −30° C. low-temperature impact performance, by using a polypropylene, which has a specific half peak width of the crystallization peak and a specific peak temperature of the crystallization peak, as a substrate resin, and by using the polyethylene and the elastomer to synergistically toughen. A disadvantage that the polypropylene composition tends to undergo a brittle failure at −30° C. under an external impact is overcome.

2. Combining the film and the sheet prepared from the polypropylene composition material of the present invention into the automotive interior parts can enable the external accessories not only to be less likely to generate sharp fragments while being strongly impacted, but also to have a matte characteristic.

3. The film and the sheet prepared from the material of the present invention not only have a good compatibility with a polypropylenes thermoplastic material, but also have a good compatibility with a TPOs material. The film and the sheet can be combined in an airbag door area of B side of the instrument board, improving a welding pull-out force between the instrument board and an airbag frame, meanwhile improving the tenacity of the parts and hence the instrument board as a whole, as well as improving a low-speed/high-speed impact resistance of the airbag door for the instrument board after a normal-temperature/low-temperature/high-temperature/aging cycle, to prevent a partial fracture of the airbag door and prevent the partial fracture flying out caused by an interference of the airbag door to a windscreen, a characteristic slot of the instrument board, a characteristic ridge of the instrument board or other structures due to the deployment of the airbag, and improve a deployment safety of a side airbag of the instrument board for passenger, to better protect the safety of the side passenger when the airbag blasts which is caused by an accident of the automobile.

4. In the present invention, the preparation process is simple, requirements for devices are low, and a yield of product is high which can be used in a production of an automotive interior parts material.

DETAILED DESCRIPTION OF THE PREFERRED EMBODIMENT

The present invention is specifically described below by embodiments, but the present invention is not limited by the following embodiments.

The raw materials used in the embodiments and comparative examples are described as below, but not limited by these:

Polypropylene 1: an isotactic index is 94%, a MFR (230° C., 2.16 kg) is 1.0 g/10 min, a half peak width of a crystallization peak of the polypropylene is 5° C. and a peak temperature of the crystallization peak of the polypropylene is 110° C.;

Polypropylene 2: the isotactic index is 95%, the MFR (230° C., 2.16 kg) is 3.0 g/10 min, the half peak width of the crystallization peak of the polypropylene is 7.3° C. and the peak temperature of the crystallization peak of the polypropylene is 105° C.;

Polypropylene 3: the isotactic index is 98%, the MFR (230° C., 2.16 kg) is 5.0 g/10 min, the half peak width of the crystallization peak of the polypropylene is 10° C. and the peak temperature of the crystallization peak of the polypropylene is 108° C.;

Polypropylene 4: the isotactic index is 96%, the MFR (230° C., 2.16 kg) is 4.0 g/10 min, the half peak width of the crystallization peak of the polypropylene is 9° C. and the peak temperature of the crystallization peak of the polypropylene is 112° C.;

Polypropylene 5: the isotactic index is 96%, the MFR (230° C., 2.16 kg) is 2.0 g/10 min, the half peak width of the crystallization peak of the polypropylene is 5° C. and the peak temperature of the crystallization peak of the polypropylene is 115° C.;

Polypropylene 6: the isotactic index is 98%, the MFR (230° C., 2.16 kg) is 8.0 g/10 min, the half peak width of the crystallization peak of the polypropylene is 12° C. and the peak temperature of the crystallization peak of the polypropylene is 125° C.;

Polypropylene 7: the isotactic index is 98%, the MFR (230° C., 2.16 kg) is 0.5 g/10 min, the half peak width of the crystallization peak of the polypropylene is 4.8° C. and the peak temperature of the crystallization peak of the polypropylene is 102° C.;

Ethene-hexene copolymer: a density is 0.860 g/cm³, and the MFR (190° C., 2.16 kg) is 0.5 g/10 min;

Ethene-butene copolymer: the density is 0.865 g/cm³, and the MFR (190° C., 2.16 kg) is 0.5 g/10 min;

Ethane-octene copolymer: the density is 0.855 g/cm$^3$, and the MFR (190° C., 2.16 kg) is 1.0 g/10 min;

Ethene-propylene copolymer: the density is 0.856 g/cm$^3$, and the MFR (190° C., 2.16 kg) is 1.0 g/10 min;

High-density polyethylene 1: the density is 0.94 g/cm$^3$, and the MFR (190° C., 2.16 kg) is 0.01 g/10 min;

High-density polyethylene 2: the density is 0.95 g/cm$^3$, and the MFR (190° C., 2.16 kg) is 0.05 g/10 min;

High-density polyethylene 3: the density is 0.97 g/cm$^3$, and the MFR (190° C., 2.16 kg) is 0.5 g/10 min;

High-density polyethylene 4: the density is 0.95 g/cm$^3$, and the MFR (190° C., 2.16 kg) is 8.0 g/10 min; and Antioxidant: the antioxidant is a mixture of a hindered phenol antioxidant 1010 and a phosphites antioxidant 168 in a ratio of 1:1.

Embodiments 1-8

Components were weighed according to the parts by weight as shown in Table 1. The polypropylene, an elastomer and the high-density polyethylene were first blended for 3 minutes in a high-speed mixer, and then the antioxidant and a lubricant were added followed by blending again for 2 minutes, with a rotate speed of 2000 rpm, and a premix compound was obtained; the premix compound was melt-extruded by a twin-screw extruder, a temperature of each district of the screw was maintained at 190 to 230° C., and a polypropylene composition that has a good low-temperature tenacity was obtained by a vacuum pelletizing. The polypropylene composition was made into corresponding test pieces with which mechanical performances of the polypropylene composition were tested, and the specific values were listed in Table 1.

TABLE 1

Components and performances of the polypropylene composition in the embodiments

| Number | Embodiments (in parts by weight) | | | | | | | |
|---|---|---|---|---|---|---|---|---|
| Raw Material | 1 | 2 | 3 | 4 | 5 | 6 | 7 | 8 |
| polypropylene 1 | 74.6 | — | — | — | — | — | | |
| polypropylene 2 | — | 56.3 | — | 64.3 | 69.3 | — | | |
| polypropylene 3 | — | — | 45.2 | — | — | 54.1 | | |
| polypropylene 4 | | | | | | | 52.2 | |
| polypropylene 5 | | | | | | | | 54.3 |
| ethene-hexene copolymer | 20 | — | — | — | — | 10 | | 10 |
| ethene-butene copolymer | — | — | 35 | — | — | 15 | 28 | 15 |
| ethane-octene copolymer | — | 25 | — | 20 | 20 | — | | |
| high-density polyethylene 1 | 5 | — | — | — | — | — | 19 | |
| high-density polyethylene 2 | — | 18 | — | — | 10 | 20 | | 20 |
| high-density polyethylene 3 | — | — | 19 | 15 | — | — | | |
| antioxidant | 0.2 | 0.3 | 0.4 | 0.5 | 0.4 | 0.4 | 0.4 | 0.5 |
| polyethylene wax | 0.2 | 0.4 | 0.4 | 0.2 | — | 0.2 | 0.4 | 0.2 |
| oxidized polyethylene wax | — | — | — | — | 0.3 | 0.3 | | |
| Mechanical performances and gloss | | | | | | | | |
| density (g/cm$^3$) | 0.903 | 0.906 | 0.910 | 0.907 | 0.905 | 0.911 | 0.908 | 0.904 |
| melting index (g/10 min) | 0.83 | 2.68 | 3.21 | 2.86 | 2.80 | 3.10 | 2.15 | 1.22 |
| tensile strength (MPa) | 18.6 | 18.4 | 17.9 | 18.9 | 18.8 | 18.8 | 18.9 | 18.7 |
| elongation at break (%) | 320 | 347 | 415 | 368 | 440 | 380 | 480 | 311 |
| bending strength (MPa) | 17.2 | 15.5 | 14.5 | 15.9 | 15.3 | 15.0 | 16.1 | 16.8 |
| bending modulus (MPa) | 730 | 567 | 496 | 611 | 593 | 550 | 680 | 710 |
| notched Izod impact strength (23° C.) (kJ/m$^2$) | 56.8 | 68.5 | 75.3 | 64.3 | 65.5 | 63.4 | 68.2 | 53.2 |
| notched Izod impact strength (−30° C.) (kJ/m$^2$) | 48.3 | 61.5 | 66.9 | 60.8 | 48.7 | 58.4 | 67.3 | 44.2 |
| gloss (60°) | 42.1 | 36.7 | 32.4 | 38.6 | 36.1 | 37.2 | 31.2 | 45.0 |

Comparative Examples 1-6

Components were weighed according to the parts by weight as shown in Table 2, a preparation method is the same as that of the embodiments, and performance test values were listed in Table 2.

TABLE 2

Components and performances of the polypropylene composition of the comparative examples

| Number | Comparative Examples (in parts by weight) | | | | | |
|---|---|---|---|---|---|---|
| Raw Material | 1 | 2 | 3 | 4 | 5 | 6 |
| polypropylene 1 | 74.6 | — | — | — | — | — |
| polypropylene 2 | — | 56.3 | — | — | — | — |
| polypropylene 3 | — | — | — | — | 50 | 54.1 |
| polypropylene 6 | — | — | 45.2 | — | — | — |
| polypropylene 7 | — | — | — | 64.3 | — | — |
| ethene-hexene copolymer | 20 | — | — | — | — | 10 |
| ethene-butene copolymer | — | — | 35 | — | — | 15 |
| ethane-octene copolymer | — | — | — | 20 | — | — |
| ethene-propylene copolymer | — | — | — | — | 30 | — |
| high-density polyethylene 1 | — | — | — | — | 20 | — |
| high-density polyethylene 2 | — | 18 | — | — | — | — |
| high-density polyethylene 3 | — | — | 19 | 15 | — | — |
| high-density polyethylene 4 | — | — | — | — | — | 20 |
| antioxidant | 0.2 | 0.3 | 0.4 | 0.5 | 0.5 | 0.4 |
| polyethylene wax | — | 0.4 | 0.4 | 0.2 | — | 0.2 |
| oxidized polyethylene wax | — | — | — | — | 0.2 | 0.3 |
| Mechanical performances and gloss | | | | | | |
| density (g/cm$^3$) | 0.900 | 0.902 | 0.912 | 0.905 | 0.912 | 0.920 |
| melting index (g/10 min) | 0.91 | 1.82 | 5.15 | 0.40 | 3.08 | 4.62 |
| tensile strength (MPa) | 16.7 | 28.3 | 19.1 | 23.6 | 16.2 | 16.5 |
| elongation at break (%) | 480 | 78 | 156 | 276 | 352 | 233 |
| bending strength (MPa) | 15.1 | 31.0 | 16.3 | 18.6 | 14.1 | 15.3 |
| bending modulus (MPa) | 580 | 1100 | 986 | 685 | 480 | 620 |
| notched Izod impact strength (23° C.) (kJ/m$^2$) | 64.3 | 18.6 | 32.3 | 58.3 | 61.1 | 56.2 |
| notched Izod impact strength (−30° C.) (kJ/m$^2$) | 30.7 | 4.2 | 4.1 | 3.8 | 4.2 | 3.5 |
| gloss (60°) | 68.2 | 62.3 | 59.8 | 46.2 | 65.0 | 72.6 |

Each performance test was performed according to the standard in the Table 3 below:

TABLE 3

| Test Item | Unit | Test Standard |
|---|---|---|
| melt flow rate | g/10 min | ISO 1133 |
| density | g/cm$^3$ | ISO 1183 |
| tensile strength | MPa | ISO 527-1, 527-2 |
| elongation at break | % | ISO 527-1, 527-2 |
| bending strength | MPa | ISO 178 |
| bending modulus | MPa | ISO 178 |
| notched Izod impact strength (23° C.) | kJ/m$^2$ | ISO 180 |
| notched Izod impact strength (−30° C.) | kJ/m$^2$ | ISO 180 |
| gloss (60°) | | ASTM D523 |
| half peak width of the crystallization | ° C. | ISO 11357 |
| peak temperature of the crystallization peak | ° C. | ISO 11357 |

It can be seen from the test results of the mechanical performances and the gloss of the embodiments and comparative examples that by using the polypropylenes with specific half peak width of the crystallization peak and peak temperature of the crystallization peak as a domain resin and synergistically toughening by a combination of the polyethylenes and the elastomers, the obtained polypropylene composition material achieved a greater improvement in impact performances, especially −30° C. low-temperature impact performance. In addition to a good impact tenacity, the prepared material has a relatively low gloss. A film or a sheet made from the material could be applied to automotive interior parts, efficiently solving the issue of that the automotive interior parts tend to undergo a brittle fracture under a low-temperature high-speed impact.

What is claimed:

1. A polypropylene composition, characterized in that, it comprises following components in parts by weight based on the whole composition:
   a polypropylene 45 to 75 parts;
   an elastomer 10 to 35 parts; and
   a polyethylene 5 to 20 parts;
      wherein a half peak width of a crystallization peak of the polypropylene is 5° C. to 10° C.; a peak temperature of the crystallization peak of the polypropylene is 105° C. to 115° C.; and the half peak width of the crystallization peak and the peak temperature of the crystallization peak are tested at a cooling rate of 10° C./min according to a standard of ISO 11357.

2. The polypropylene composition according to claim 1, wherein the polypropylene is a homopolymerized polypropylene, with an isotactic index of 94% to 98% and a melt flow rate of 1 g/10 min to 5 g/10 min under a load of 2.16 kg at 230° C.

3. The polypropylene composition according to claim 1, wherein the elastomer is one or a mixture of an ethene-hexene copolymer, an ethene-butene copolymer and an ethane-octene copolymer, a density of the elastomer is 0.850 g/cm$^3$ to 0.865 g/cm$^3$, and the melt flow rate at 190° C. under the load of 2.16 kg is 0.1 g/10 min to 3 g/10 min.

4. The polypropylene composition according to claim 1, wherein the polyethylene is a high-density polyethylene HDPE, with a density of 0.94 g/cm$^3$ to 0.97 g/cm$^3$, and the melt flow rate at 190° C. under the load of 2.16 kg is 0.01 g/10 min to 0.5 g/10 min.

5. The polypropylene composition according to claim 1, wherein the polypropylene composition further comprises 0.1 part to 0.5 part of an antioxidant and 0.1 part to 0.5 part of a lubricant in parts by weight based on the whole composition.

6. The polypropylene composition according to claim 5, wherein the antioxidant is a mixture of a hindered phenol antioxidant and a phosphites antioxidant in a ratio of 1:1-2.

7. The polypropylene composition according to claim 5, wherein the lubricant is one or a mixture of a polyethylene wax and an oxidized polyethylene wax.

8. A preparation method of the polypropylene composition as in one of claims 1-7, characterized in that, it comprises the following steps:
   (1) weighing each component in proportion, blending a polypropylene, an elastomer and a polyethylene in a high-speed mixer for 1 to 3 minutes, then adding an antioxidant and a lubricant followed by blending again for 1 to 3 minutes, with a rotate speed of 1000 to 2000 rpm, and obtaining a premix compound; and
   (2) melt-extruding the premix compound by a twin-screw extruder, a temperature of each district of the screw being 190-230° C., and obtaining the polypropylene composition by a vacuum pelletizing.

9. The method according to claim 8, further comprises:
   preparing a film or a sheet from the polypropylene composition; and
   using the film or the sheet in forming at least one product of automotive interior parts.

10. The method according to claim 9, wherein the at least one product of automotive interior parts are an instrument board, an auxiliary instrument board, an upright or a door panel.

11. The method according to claim 9, wherein the film or the sheet has a thickness of 0.01 mm to 10 mm.

12. The method according to claim 11, wherein the at least one product of automotive interior parts are an instrument board, an auxiliary instrument board, an upright or a door panel.

13. A film or a sheet prepared from the polypropylene composition as in one of claims 1-7.

14. The film or the sheet according to claim 13, wherein a thickness of the film or the sheet is 0.01 mm to 10 mm.

15. The polypropylene composition according to claim 1, wherein the half peak width of the crystallization peak of the polypropylene is 7° C. to 9° C.

16. The polypropylene composition according to claim 1, wherein the peak temperature of the crystallization peak of the polypropylene is 108° C. to 112° C.

* * * * *